United States Patent [19]

Honda

[11] Patent Number: 5,970,084
[45] Date of Patent: Oct. 19, 1999

[54] CDMA MOBILE COMMUNICATION RECEIVING APPARATUS

[75] Inventor: Shoichiro Honda, Kanagawa, Japan

[73] Assignee: Matsushita Electric Industrial Co., Ltd., Osaka, Japan

[21] Appl. No.: 08/873,331

[22] Filed: Jun. 12, 1997

[30] Foreign Application Priority Data

Jun. 13, 1996 [JP] Japan ................................ 8-172863

[51] Int. Cl.⁶ .......................... H04K 1/00; H04B 7/216
[52] U.S. Cl. ...................... 375/200; 375/206; 375/349; 370/342
[58] Field of Search .................... 375/200, 206, 375/208, 209, 354, 367, 316, 349; 370/335, 342, 320, 441, 513, 503; 455/303

[56] References Cited

U.S. PATENT DOCUMENTS

| | | |
|---|---|---|
| 5,459,763 | 10/1995 | Hori et al. ............................... 375/367 |
| 5,550,811 | 8/1996 | Kaku et al. .............................. 370/515 |
| 5,724,384 | 3/1998 | Kim et al. ................................ 375/208 |
| 5,822,384 | 10/1998 | Thebault et al. ....................... 375/200 |

*Primary Examiner*—Stephen Chin
*Assistant Examiner*—Betsy L. Deppe
*Attorney, Agent, or Firm*—Pearne, Gordon, McCoy & Granger LLP

[57] ABSTRACT

A mobile communication receiver of a spread spectrum communication system has a plurality of fingers, a synthesizer for synthesizing data reproduced by the fingers, a power measurement unit for measuring power of reproduction output of the fingers and total power thereof, a error detection unit for detecting an error of output data of the synthesizer, and a control unit for controlling power on and off of the fingers based on the measurement result of the power measurement unit and the error detection result of the error detection means. Power consumption can be reduced in the range in which an error increase does not result.

8 Claims, 7 Drawing Sheets

CDMA MOBILE COMMUNICATION RECEIVING APPARATUS

BACKGROUND OF THE INVENTION

1. Field of the Invention

The present invention relates to a mobile communication receiving apparatus for spread spectrum (SS) communication used for code division multiple access (CDMA) communication or radio local area network (radio LAN) communication in a mobile communication field, and in particular to reduction in power consumption and enlargement of the synchronization acquisition and hunt range.

2. Description of the Related Art

Since SS communication in a mobile communication field can cover a code division multiple access system and is also excellent in resistance to noise, it is applied to CDMA communication and radio LAN communication. With reference to FIG. 6, a conventional mobile communication receiver for SS communication comprises a reception antenna 1 for receiving signals, high-frequency circuitry 2 made up of a signal amplifier (referred to simply "amplifier"), a frequency convertor, and a band-pass filter (BPF), a low-pass filter (LPF) 3 for limiting reception signals to a base band, three inverse spread modulation and data demodulation sections, which will be hereinafter referred to as fingers, 4, 9, and 14 for inversely spread modulating reception signals spread modulated at transmitting side and reproducing modulation data components, and a synthesizer 20 for synthesizing output signals of the fingers for amplifying the data signal strength, as shown in FIG. 6.

Each of the fingers 4, 9, and 14 is made up of a PN code generation section 5, 10, 15 for generating the same pseudonoise (PN) code sequence as a transmitter, a synchronization acquisition/hunt section 6, 11, 16 for executing inverse spread modulation while synchronizing with the timing of a PN code of a reception signal and hunting the timing, an integrator 8, 13, 18 for integrating an inversely spread modulated reception signal for a given time for reproducing data, and a VCC section 7, 12, 17 for generating a voltage-controlled clock (VCC) used as a clock of the PN code generation section 5, 10, 15. The PN code generation sections 5, 10, and 15 are of the same configuration and perform the same operation; the integrators 8, 13, and 18 are of the same configuration and perform the same operation; and the VCC sections 7, 12, and 17 are of the same configuration and perform the same operation. The synchronization acquisition/hunt sections 6, 11, and 16 are of the same configuration, but execute inverse spread modulation at different timings.

The fingers execute inverse spread modulation at different timings for reproducing data and the synthesizer 20 synthesizes the reproduced data, whereby the receiver enables pass diversity for separating and synthesizing direct waves and multiple-reflected waves for reproducing data.

FIG. 7 shows the configuration of the finger in more detail. The finger, which has a delay lock loop (DLL) structure, comprises a multiplier 23 for multiplying PN code PN[k−1] leading inversely spread modulated PN code PN[k] by one chip in phase by a reception signal; a multiplier 24 for multiplying PN code PN[k+1] lagging PN[k] by one chip in phase by the reception signal, a multiplier 25 for multiplying PN[k] by the reception signal to output an inverse spread modulation output signal, an integrator 26 for integrating the output signals of the multiplier 23, an integrator 27 for integrating the output signals of the multiplier 24, a subtractor 48 for subtracting an output signal of the integrator 26 from an output signal of the integrator 27, a loop filter 29 for removing a noise component from an output component of the subtractor 48, an integrator 30 for integrating the output signals of the multiplier 25 and reproducing data, a threshold determiner 49 for comparing an output signal of the integrator 30 with a threshold value for determination, a voltage-controlled clock (VCC) 33 whose phase is controlled by an output signal of the loop filter 29, a feedback shift register 34 of N register length (taps) for cyclically shifting PN code by the VCC 33 output clock, and a PN code generator 35 for generating a PN code pattern of a transmitter.

The PN code generator 35 has a function of making output lag behind or lead ahead by several chip intervals.

Next, the operation principle of the finger of the DLL structure will be discussed with FIGS. 4A to 4D. In SS communication, for inverse spread modulation, a transmitter and a receiver have the same PN code sequence and multiply the same code at the same timing. The synchronization acquisition and hunt operation will be discussed.

FIG. 4A shows the output of an integrator 30. The vertical axis is an auto-correlation function R(t) of a PN code sequence of a transmitter and a receiver and corresponds to the output of the integrator 30 in FIG. 7. The horizontal axis shows PN code timing differences between the transmitter and receiver, wherein dt denotes one chip interval. When the PN code timing difference between the transmitter and receiver is 0, R(t) indicates the maximum value; when the PN code timing difference is 1 chip or more, R(t) becomes 1/L (L: Integration number) and almost 0 because L is sufficiently large. Therefore, data demodulation is impossible in the receiver when PN code synchronization is not acquired.

Then, in order to acquire synchronization, the receiver checks R(t) by the threshold determiner 49. When R(t) is equal to or less than a threshold value, the receiver makes the output PN code of the PN code generator 35 lag behind or lead ahead by several chip intervals for timing adjustment and again checks R(t). The receiver repeats this operation until the output of the integrator 30 exceeds the threshold value. When the output exceeds the threshold value, the receiver fixes the timing for acquiring synchronization. This is the synchronization acquisition operation principle.

Next, in order to hold the synchronization, the PN code of the reception signal is hunted. The hunt operation will be discussed with FIGS. 4A to 4D. FIG. 4B shows an output characteristic of the subtractor 48 (D2(t)). Receiver PN codes used by the multipliers 23 and 24 (PN[k−1] and PN[k+1]) are 1 chip lead and lag signals ahead and behind PN code PN[k] used for inverse spread modulation in the multiplier 25. Therefore, the auto-correlation functions (outputs of the integrators 26 and 27) are provided by shifting R(t) in FIG. 4A −dt and +dt and have the maximum values at −dt and +dt. Since the integrator 26 output is inverted and synthesized with the integrator 27 output by the subtractor 48, the output characteristic of the subtractor 48, D2(t), becomes as shown in FIG. 4B. Therefore, D2(t) becomes an increasing function passing through the origin at the ±dt interval. Thus, if the PN code phase difference is drawn into within ±dt, the phase of the VCC 33 is controlled by the signal resulting from removing the noise component of D2(t) through the loop filter 29, whereby the PN code of the reception signal can be hunted.

The description of the configuration and operation principle of the conventional mobile communication receiver for SS communication is now complete.

However, the conventional mobile communication receiver having a plurality of fingers involves a problem of an increase in power consumption.

When a DLL is used as the finger, because of the characteristics thereof, synchronization acquisition and hunting are limited in the range of ±dt at the maximum.

SUMMARY OF THE INVENTION

It is an object of the invention to provide a receiving apparatus for a mobile communication that can reduce power consumption of fingers and enlarge the synchronization acquisition and hunt range.

The receiver for a mobile communication according to the present invention comprises: a power measurement unit for measuring power of reproduction output of the fingers and total power thereof, an error detection unit for detecting an error of output data of a synthesizer, and a control unit for controlling power on and off of the fingers based on the measurement result of the power measurement unit and the error detection result of the error detection unit. According to the configuration, the fingers can be powered off in the range in which an error increase does not result for reducing power consumption.

Each of the fingers comprises a first multiplier for multiplying a PN code (PN[k]) synchronized with a PN code of a transmitter by a base band reception signal, a second multiplier for multiplying a PN code (PN[k−1]) leading the PN[k] by one chip in phase by the base band reception signal, a third multiplier for multiplying a PN code (PN[k+1]) lagging the PN[k] by one chip in phase by the base band reception signal, an adder-subtractor for performing addition and subtraction on integration values of outputs of the second and third multipliers, PN code supply means for changing phases of the PN codes generated by a PN code generator and supplying the resultant PN codes to the first, second, and third multipliers, and PN code control means for controlling the phase amount of the PN code changed by the PN code supply means based on the addition and subtraction result values of the adder subtractor and integration output of the first multiplier. According to the configuration, the PN synchronization acquisition and hunt range can be enlarged.

DETAILED DESCRIPTION OF THE INVENTION

Figure 1:
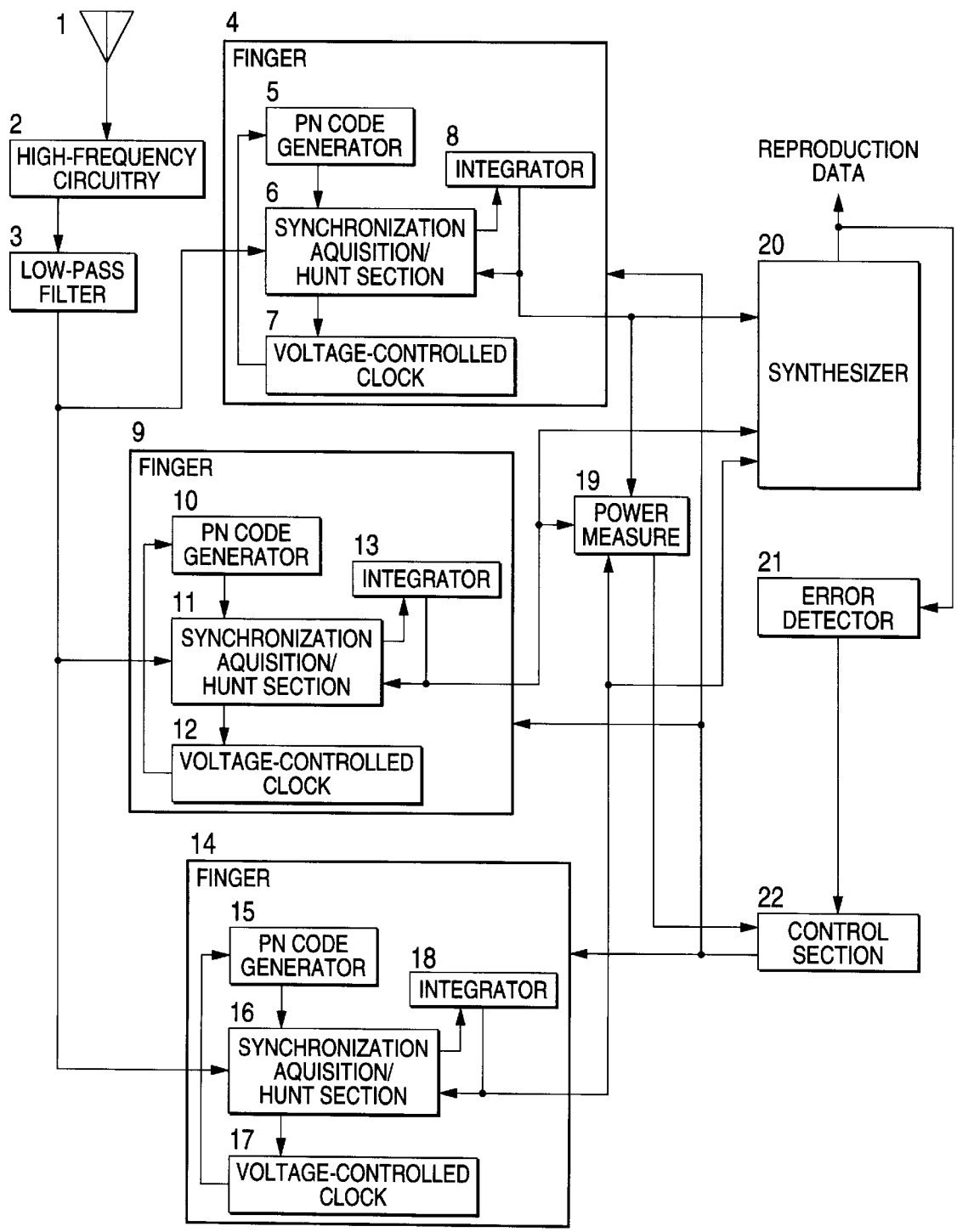
FIG. 1 is a block diagram to show the configuration of a mobile communication receiver in a first embodiment of the invention.

Detailed description of the invention will be described as follows referring to the accompanying drawings.

In a mobile communication receiver of a spread spectrum communication system according to the present invention having a plurality of fingers and a synthesizer for synthesizing data reproduced by fingers, a power measurement unit measures power of reproduction output of the fingers and total power thereof, an error detection unit detects an error of output data of the synthesizer, and a control unit controls power on and off of the fingers based on the measurement result of the power measurement unit and the error detection result of the error detection unit. Power consumption can be reduced.

In addition, the control unit stores the total power Ps corresponding to reference error data from the relationship between the total power measured by the power measurement unit and the error detected by the error detection unit, and if the value resulting from subtracting Ps from the total power of reproduction output of the operating fingers is equal to or greater than the value resulting from adding the power of the finger having the minimum reproduction output power among the operating fingers and a constant d, which is a positive real number, powers off the finger having the minimum reproduction output power. While the total power more than the power Ps corresponding to the reference error data is always provided, the fingers can be powered off for reducing power consumption.

Further, each of the fingers has a first multiplier for multiplying a PN code (PN[k]) synchronized with a PN code of a transmitter by a base band reception signal, a first integrator for integrating output of the first multiplier, a second multiplier for multiplying a PN code (PN[k−1]) leading the PN[k] by one chip in phase by the base band reception signal, a second integrator for integrating output of the second multiplier, a third multiplier for multiplying a PN code (PN[k+1]) lagging the PN[k] by one chip in phase by the base band reception signal, a third integrator for integrating output of the third multiplier, an adder-subtractor for performing addition and subtraction on outputs of the second and third integrators, a PN code generator for generating the same PN codes as the transmitter, a PN code supply unit for changing phases of the PN codes generated by the PN code generator and supplying the resultant PN codes to the first, second, and third multipliers, and a PN code control unit for controlling phase amount of the PN code changed by the PN code supply unit based on the addition and subtraction result values of the adder-subtractor and output of the first integrator. The PN synchronization acquisition and hunt range can be enlarged.

Furthermore, the PN code control unit is provided with a first comparator for comparing output of the first integrator with the addition result value of the adder-subtractor in greater-than, equal-to, or less-than relation, a second comparator for comparing the subtraction result value of the adder-subtractor with a numeric value 0 in greater-than, equal-to, or less-than relation, a third comparator for comparing a value ADD resulting from adding the addition result value of the adder-subtractor to output of the first integrator with a numeric value 0 in greater-than, equal-to, or less-than relation and outputting 1 when ADD>0, otherwise 0, a phase shifter for outputting a phase amount control value to the PN code supply unit so as to shift the phase of the PN code supplied by the PN code supply unit by one chip every integration time when the third comparator outputs 0, and a phase hunter for selectively outputting a value 0, 1 or −1 added to the output value of the phase shifter based on outputs of the first and second comparators when the third comparator outputs 1. A DLL enabling PN code synchronization acquisition and hunting in the range twice that of the conventional DLL can be configured.

Moreover, the PN code supply unit is provided with a feedback shift register for cyclically shifting the PN codes generated by the PN code generator and outputting register values PN[i] (i=1, 2, 3, . . . , N) and a selector for selecting the PN[k−1], PN[k], and PN[k+1] from among the register values PN[i] of the feedback shift register, wherein the shift amount of the feedback shift register is controlled by the output value of the phase shifter and selection of the selector is controlled by the value resulting from adding the output value of the phase shifter and output of the phase hunter. The selection of the selector is controlled so that the shift amount of the feedback shift register is adjusted until the phase difference between the PN codes of the transmitter and receiver enters the synchronization acquisition range and that the synchronization can be hunted after it is acquired.

Referring now to FIGS. 1 to 5, preferred embodiments of the present invention will be described as follows.

First Embodiment

As shown in FIG. 1, a mobile communication receiver according to a first embodiment has a reception antenna 1; high-frequency circuitry 2; a low-pass filter (LPF) 3; three fingers 4, 9 and 14 each consisting of PN code generation sections 5, 10, 15, a synchronization acquisition/hunt section 6, 11, 16, a voltage-controlled clock (VCC) 7, 12, 17 and an integrator 8, 13, 18; a power measure 19 for measuring power of an output signal of each finger 4, 9, 14 and total power; a synthesizer 20 for synthesizing the output signals of the fingers; an error detector 21 for detecting an error of an output signal of the synthesizer 20; and a control section (central processing unit (CPU)) 22 for controlling power on and off of the fingers 4, 9, and 14 based on the measurement and detection results of the power measure 19 and the error detector 21.

Figure 6:
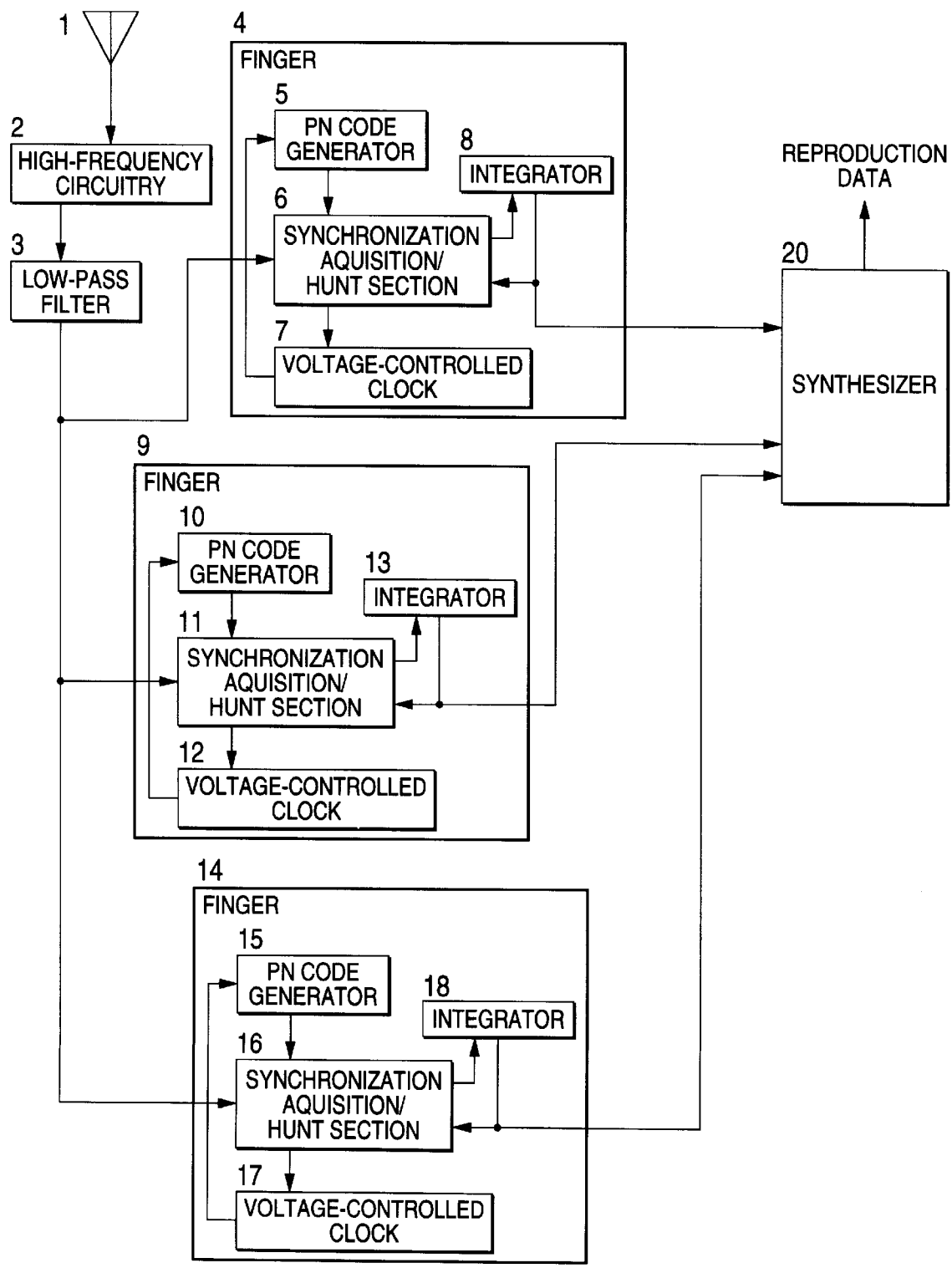
FIG. 6 is a block diagram to show the configuration of a conventional mobile communication receiver.
Figure 7:
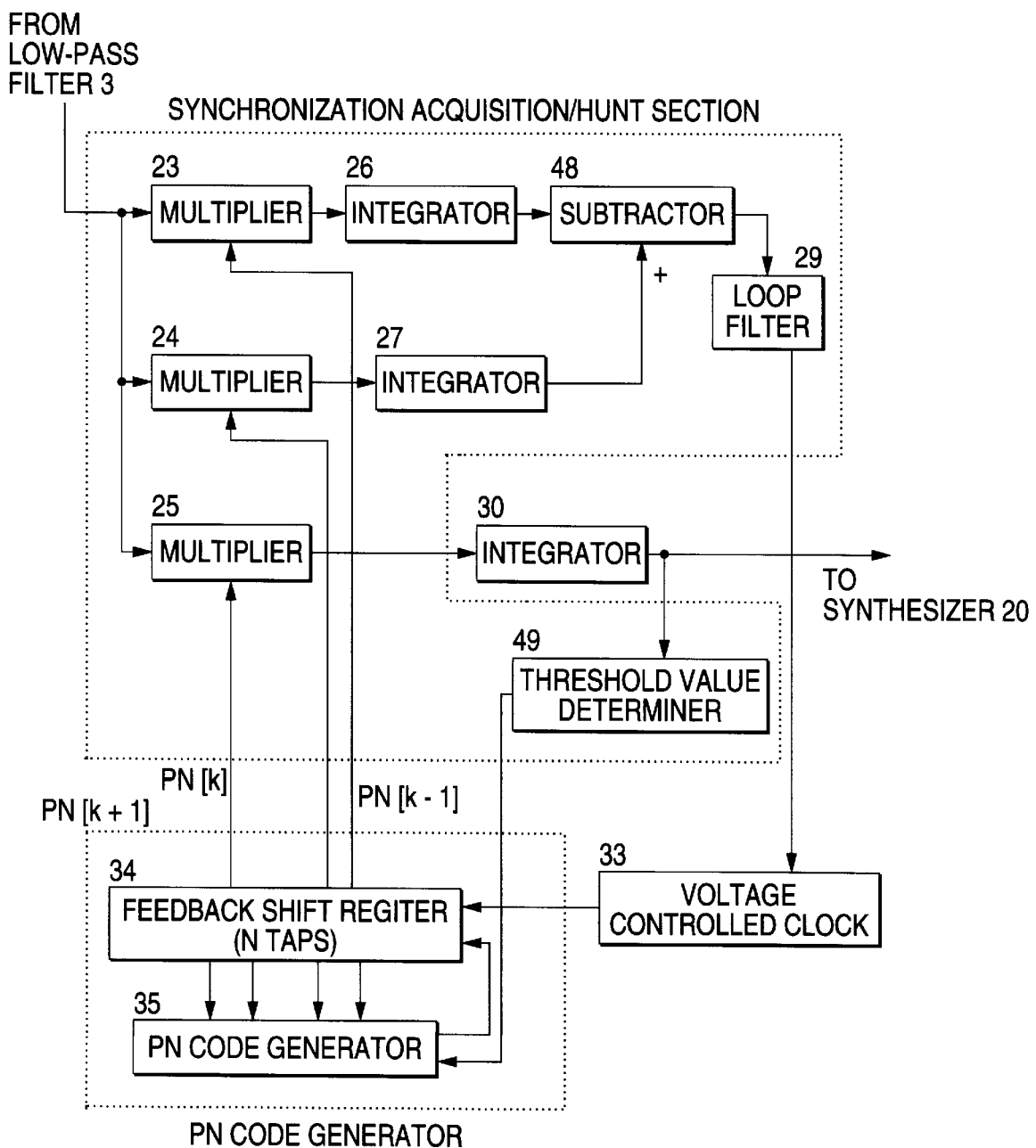
FIG. 7 is a block diagram to show the configuration of a conventional finger.
Figure 2:
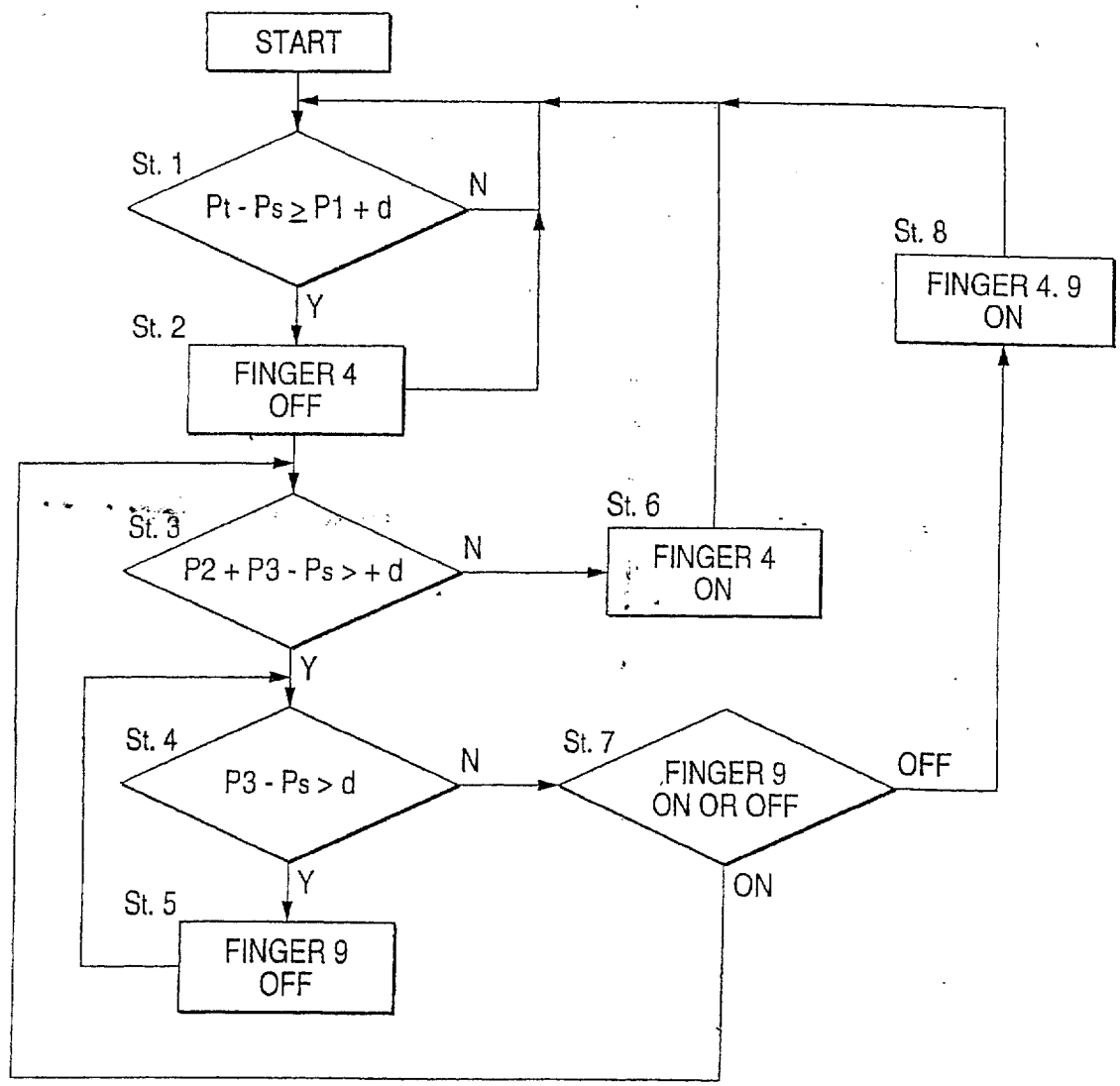
Figure 3:
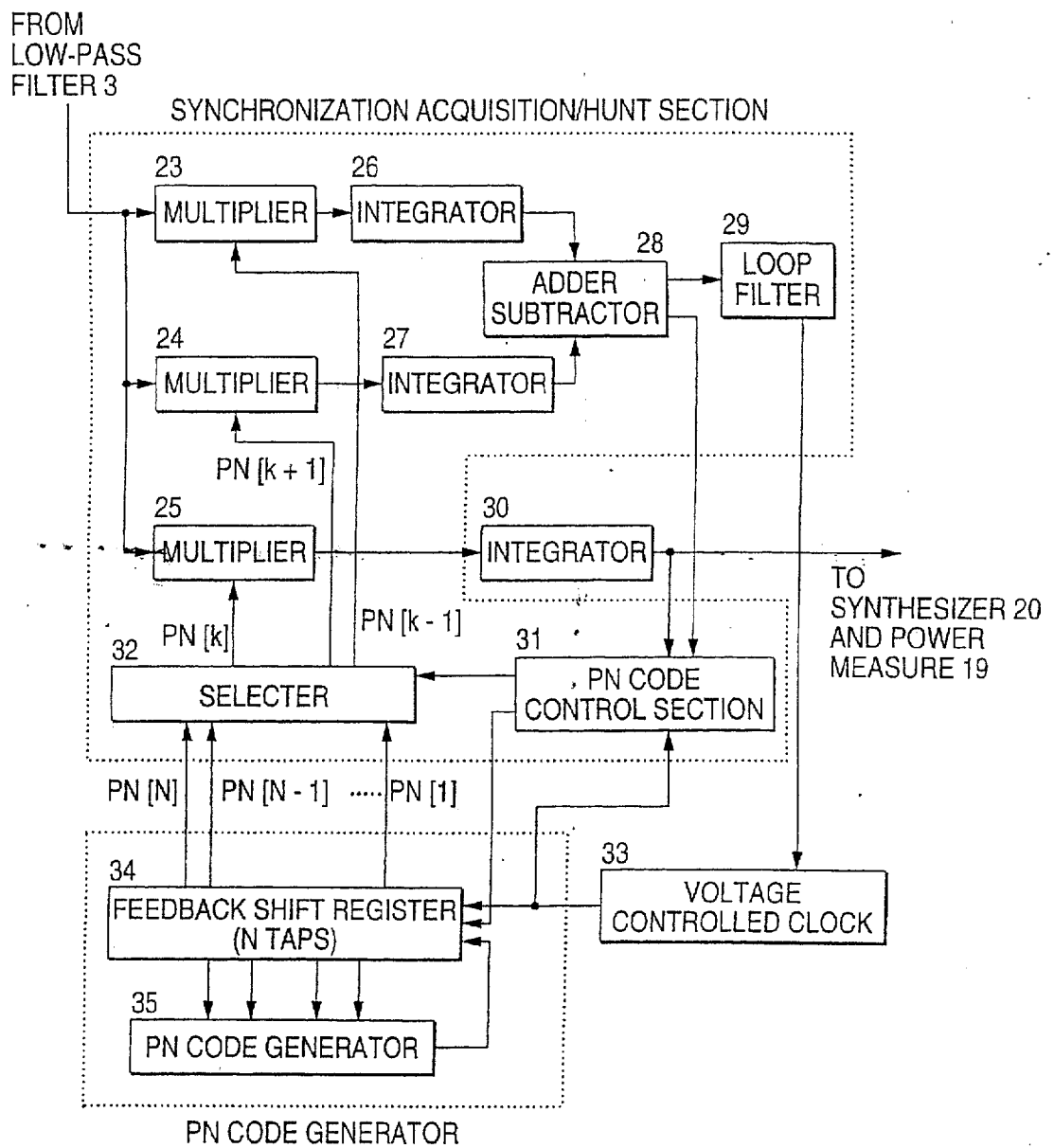
Figure 5:
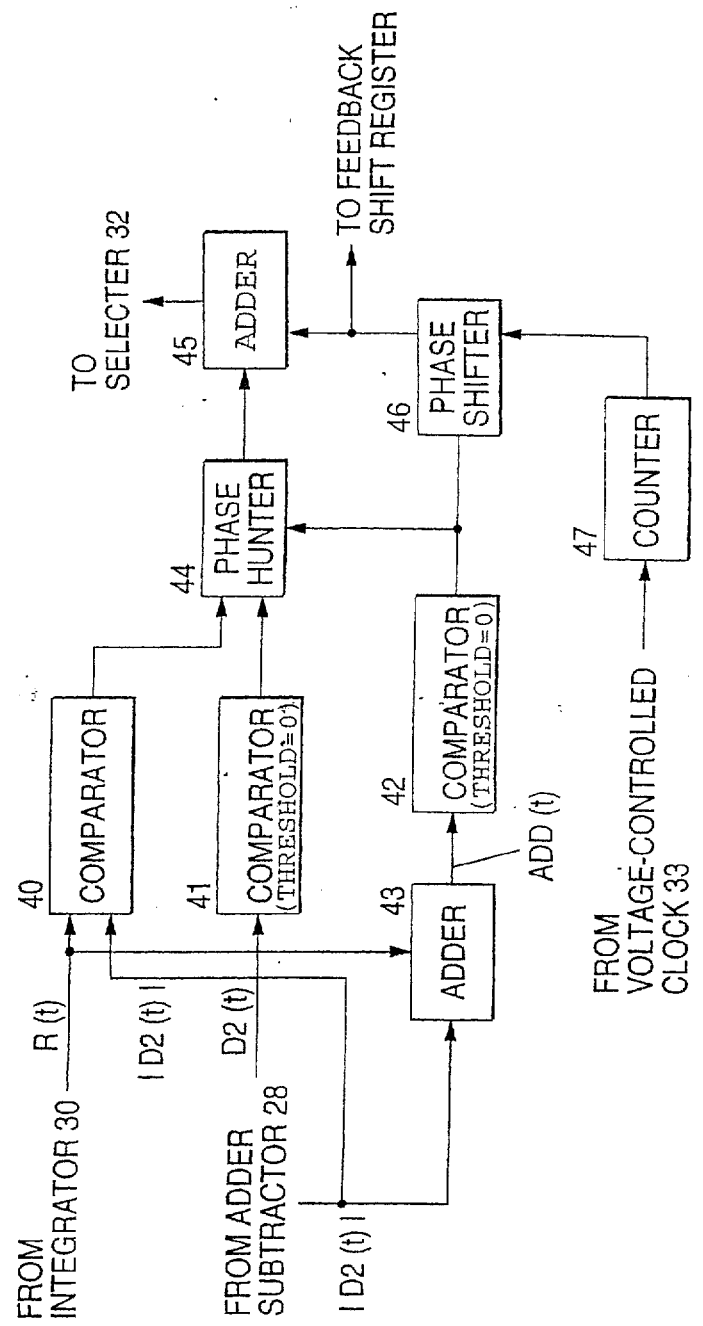
Figure 7:
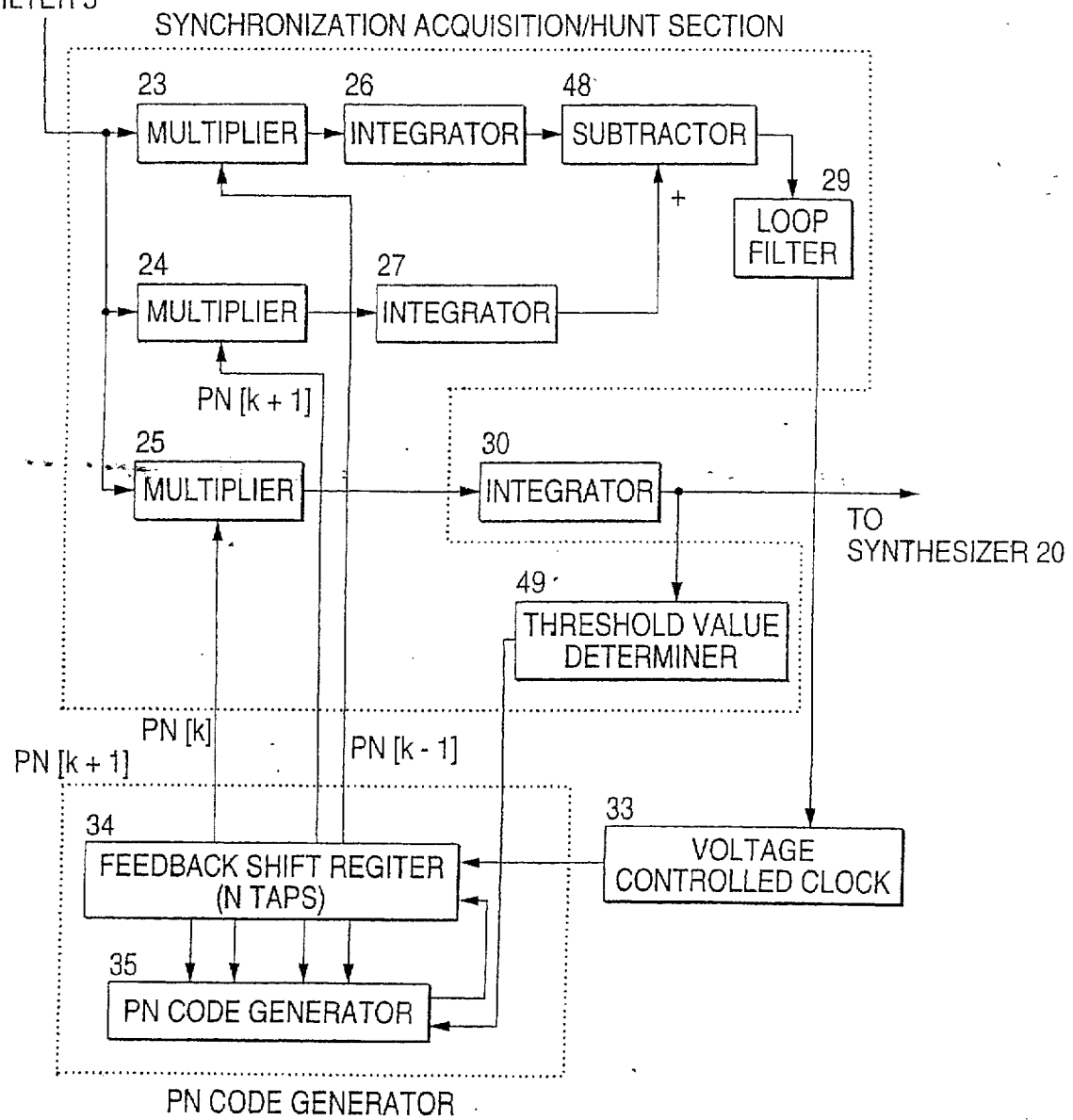

The operation of the mobile communication receiver will be discussed. First, the reception antenna 1, the high-frequency circuity 2, and the LPF 3 have the same configuration as and perform the same operation as those of the conventional receiver in FIG. 6. The finger 4 is made up of the PN code generation section 5, the synchronization acquisition/hunt section 6, the integrator 8, and the voltage-controlled clock (VCC) 7. The PN code generation section 5 outputs the same PN code as a transmitter at the same speed. The synchronization acquisition/hunt section 6 executes inverse spread modulation and outputs an inverse spread modulation output signal while synchronizing with the timing of a PN code of a reception signal and hunting the timing. The VCC 7 supplies a clock to the PN code generation section 5 and the phase of the clock is controlled by an output voltage of the synchronization acquisition/hunt section 6. The integrator 8 integrates inversely spread modulated reception signals output by the synchronization acquisition/hunt section 6 for a given time and reproduces data.

The finger 9, 14 has the same configuration as the finger 4 and performs the same operation as the finger 4, but differs from the finger 4 in inverse spread modulation timing. Thus, bus diversity is enabled by outputs of the fingers 4, 9, and 14. Power on/off control of the fingers 4, 9, and 14 is performed by the CPU 22.

The power measure 19 measures power (P1, P2, P3) of the output signal (reproduction data signal d4, d9, d14) of each of the fingers 4, 9, and 14 and total power (Pt), and transmits the measurement data to the CPU 22.

The synthesizer 20 synthesizes d4, d9, and 14. The error detector 21 detects an error of the synthesizer 20 output signal, and transmits the error data (ED) to the CPU 22.

The CPU 22 uses P1, P2, P3, Pt, and ED to perform power on/off control of the fingers 4, 9, and 14.

Figure 2:
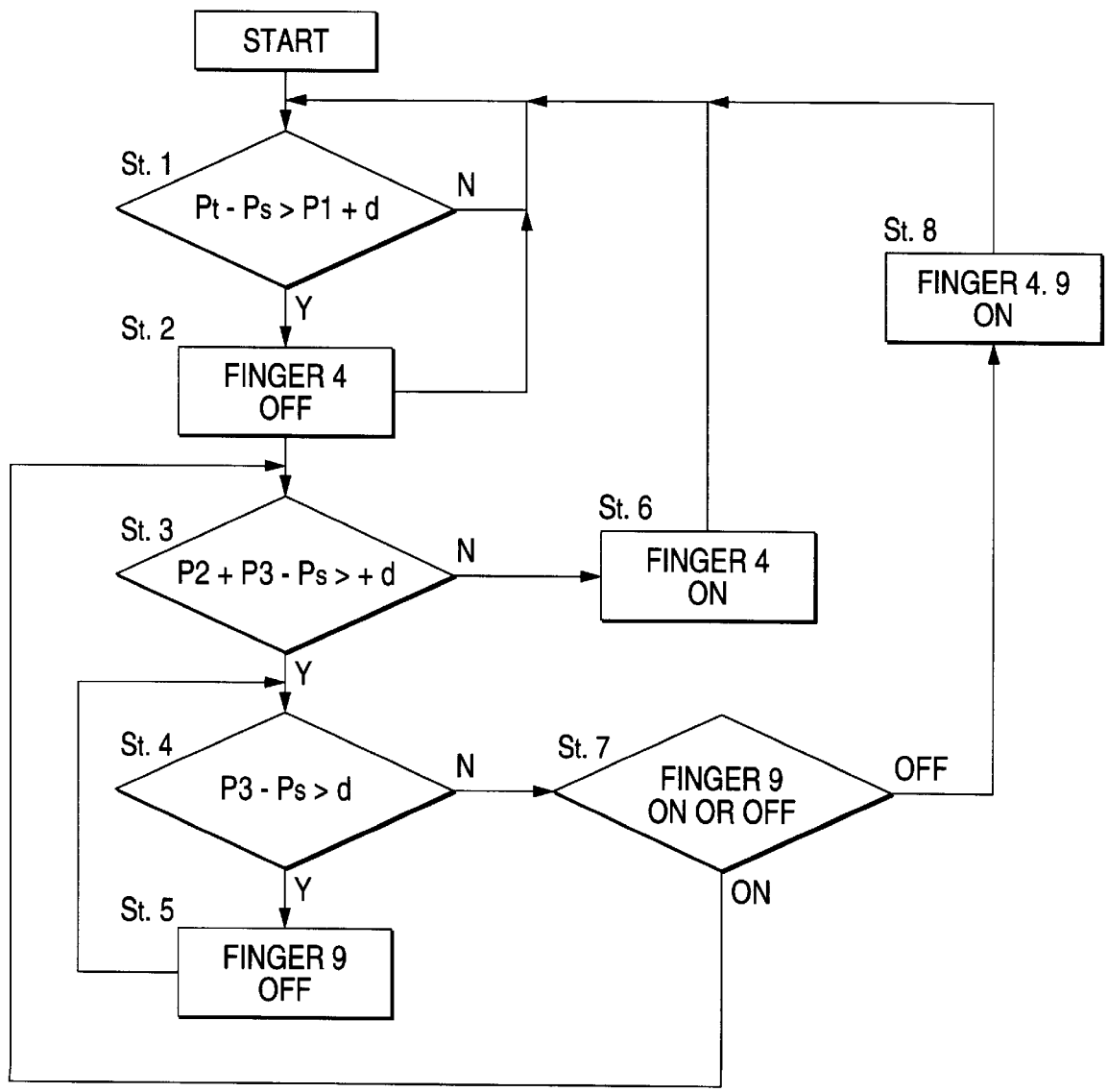
FIG. 2 is a flowchart to show an on/off control algorithm of fingers in the first embodiment of the invention.

FIG. 2 shows an on/off control procedure of the CPU 22.

The CPU 22 first checks P1, P2, and P3. Next, it checks the relationship between Pt and ED, and stores the total power Ps of the power measure 19 when reproduction data output from the synthesizer 20 contains a maximum allowable error on performance. That is, the CPU 22 stores the signal power Ps of the power measure 19 corresponding to the ED reference value defining the maximum allowable error in the reproduction data.

Here, assume that P1, P2, and P3 are assigned the following power order:

$$P1<P2<P3 \quad \text{(Expression 1)}$$

If such an assumption is made, generality is not lost.

The CPU 22

Step 1: determines whether or not the power output by the power measure 19 satisfies the relation in the following expression 2:

$$Pt-Ps>P1+d(Pt+P1+P2+P3) \quad \text{(Expression 2)}$$

where d is a positive real number;

Step 2: when the relation in expression 2 is satisfied, turns off the power of the finger 4;

Step 3: checks that the relation in the following expression 3, $$P2+P3-Ps>d \quad \text{(Expression 3)}$$

is satisfied; then

Step 4: determines whether or not the relation in the following expression 4, $$P2+P3-Ps>P2+d \quad \text{(Expression 4)}$$

is satisfied; and

Step 5: when the relation in expression 4 is satisfied, further turns off the power of the finger 9.

Next, the CPU 22 returns to step 4 and checks whether or not the relation in expression 4 is satisfied. When the relation at step 4 is not satisfied, the CPU 22

Step 7: checks whether the power of the finger 9 is on or off; and When it is off, Step 8: turns on the power of the fingers 4 and 9, then returns to step 1.

When the power of the finger 9 is on at step 7, the CPU 22 returns to step 3 and checks whether or not the relation in expression 3 is satisfied. If the relation is not satisfied, Step 6: turns on the power of the finger 4, then returns to step 1.

The receiver of the embodiment repeats the following operation: The signal power (Ps) corresponding to the reference error data (error data limit value which must be maintained at the minimum to hold the reception performance) is stored. If the difference between the total power of the finger outputs (Pt) and Ps is equal to or greater than the sum of the minimum power of the fingers and the positive constant d, the power of the finger outputting the minimum power is turned off. In this state, if the difference between the total power of the operating finger outputs (Pt) and Ps is equal to or greater than the sum of the minimum power of the operating fingers and the positive constant d, the power of the operating finger outputting the minimum power is turned off.

That is, if the power of the finger having small output power among the operating fingers is turned off, when the total power (Pt) is equal to or greater than Ps by d or more, the fingers having small output power are turned off in sequence for saving power consumption.

If the difference between the total power of the operating fingers and Ps becomes equal to or less than the sum of the minimum value of output power of the operating fingers (Pimin) and the constant d, all fingers are powered on.

Such control is repeated, whereby signals can always be received with a minimum number of fingers and power consumption can be reduced.

A similar effect can be produced if the number of fingers is integer M (M>2).

Second Embodiment

Figure 3:
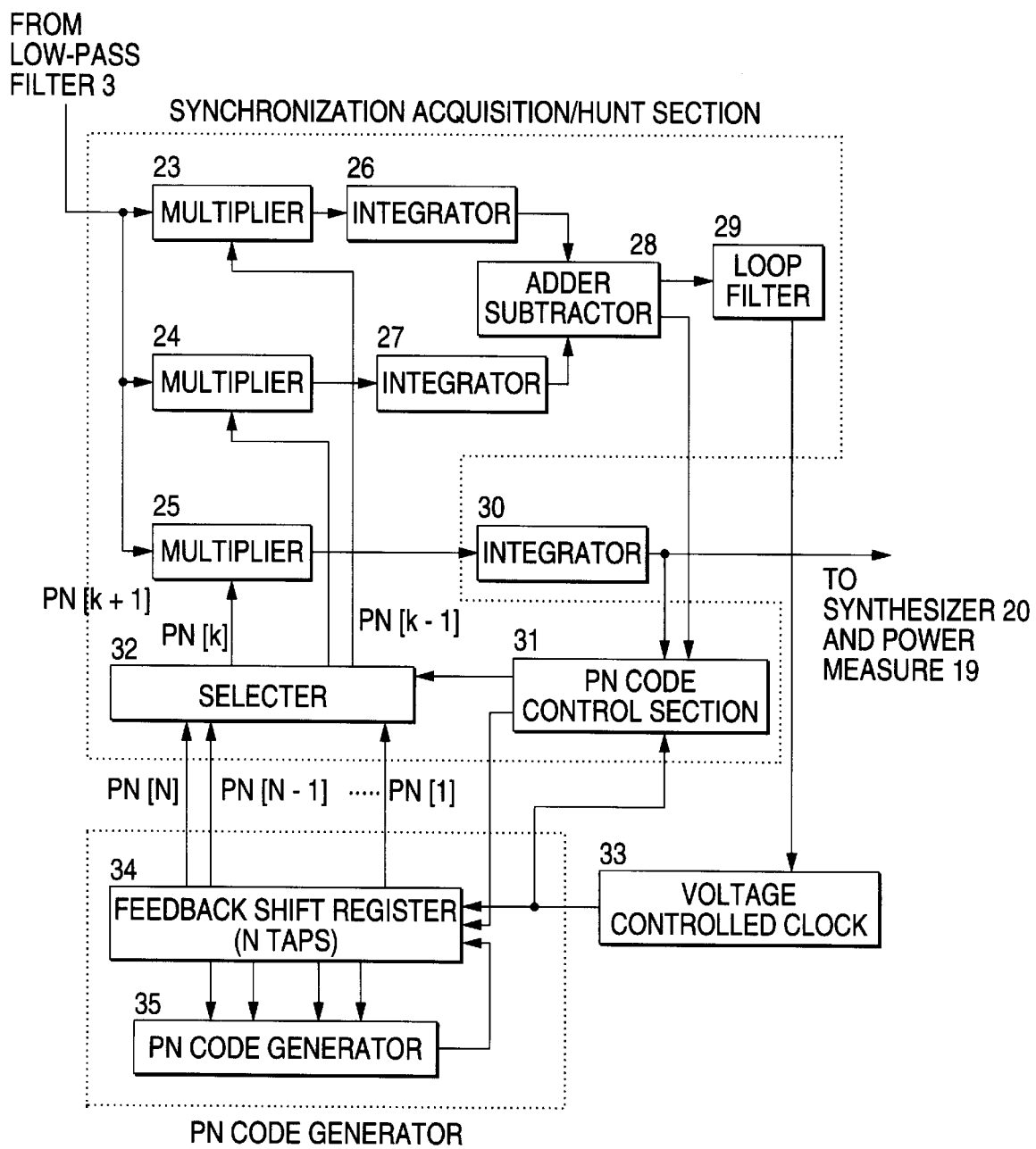
FIG. 3 is a block diagram to show the configuration of a finger in a second embodiment of the invention.

A whole mobile communication receiver of a second embodiment has the configuration in FIG. 1, and each of fingers 4, 9, and 14 has the configuration shown in FIG. 3.

The finger has a multiplier 23 for multiplying PN code PN[k−1] leading PN code PN[k] used for inverse spread modulation by one chip in phase by a reception signal, a multiplier 24 for multiplying PN code PN[k+1] lagging PN[k] by one chip in phase by the reception signal, a multiplier 25 for multiplying PN[k] by the reception signal to output an inverse spread modulation output signal, an integrator 26 for integrating the output signals of the multiplier 23, an integrator 27 for integrating the output signals of the multiplier 24, an adder-subtractor 28 for performing addition and subtraction on an output signal of the integrator 26 and an output signal of the integrator 27, a loop filter 29 for removing a noise component of the subtraction result output from the adder-subtractor 28, an integrator 30 for integrating the output signals of the multiplier 25 and reproducing data, a voltage-controlled clock (VCC) 33 whose phase is controlled by an output signal of the loop filter 29, a feedback shift register 34 of N taps for cyclically shifting PN code by the VCC 33 output clock, a PN code generator 35 for generating the same PN code pattern as a transmitter, a selector 32 for selecting PN[k−1], PN[k], and PN[k+1] out of output of the feedback shift register 34 and outputting the codes to the multipliers 23, 24, and 25, and a PN code control section 31 for resetting the shift count of the feedback shift register 34 and determining the output value of the selector 32 based on output of the adder-subtractor 28 and output of the integrator 30.

The operation of the finger thus configured will be discussed with FIGS. 4A to 4D.

The multiplier 23 multiplies the PN code (PN[k−1]) leading the PN code (PN[k]) used for inverse spread modulation by one chip by a reception signal. The multiplier 24 multiplies the PN code (PN[k+1]) lagging PN[k] by one chip by the reception signal.

The multiplier 25 multiplies PN[k] by the reception signal for inverse spread modulation. The integrators 26 and 27 integrate the output signals of the multipliers 23 and 24, respectively, for the same given time, and the adder-subtractor 28 performs adding and subtractor on the output signals of the integrators 26 and 27. To perform subtraction, the integrator 26 output signal is subtracted from the integrator 27 output signal. The substraction result signal is output to the loop filter 29 and the addition result signal and subtraction result signal are output to the PN code control section 31.

The loop filter 29 removes noise of the subtraction result signal. The output signal from the loop filter 29 becomes D2(t) in FIG. 4B. This signal controls the VCC 33 for hunting the phase of the PN code of the reception signal.

The integrator 30 integrates the inversely spread modulated reception signal for the same time as the integration time of the integrator 26, 27 for reproducing data. This reproduction data is output to the synthesizer 20 and the power measure 19 in FIG. 1.

The PN code control section 31 uses the integrator 30 output signal and the adder-subtractor 28 output signal to control the selector 32 and the feedback shift register 34, thereby enlarging the synchronization acquisition and hunt range, as described later.

The PN code generator 35 calculates a PN code pattern from specific tap output of the feedback shift register 34, and generates the same PN code pattern as a transmitter.

The feedback shift register 34 shifts the PN codes output from the PN code generator 35 by the VCC 33 clock. It is reset by the PN code control section 31, and restarts shifting the PN codes according to the shift count specified by the PN code control section 31.

Each register output of the feedback shift register 34 is output to the selector 32. Then, the selector 32 selects one PN code (PN[k]) used for inverse spread modulation based on the signal of the PN code control section 31 from the register outputs of the feedback shift register 34, then, selects the register values preceding and following the selected PN code (PN[k−1] and PN[k+1]), and outputs the PN codes to the multipliers 25, 23 and 24.

Figure 5:
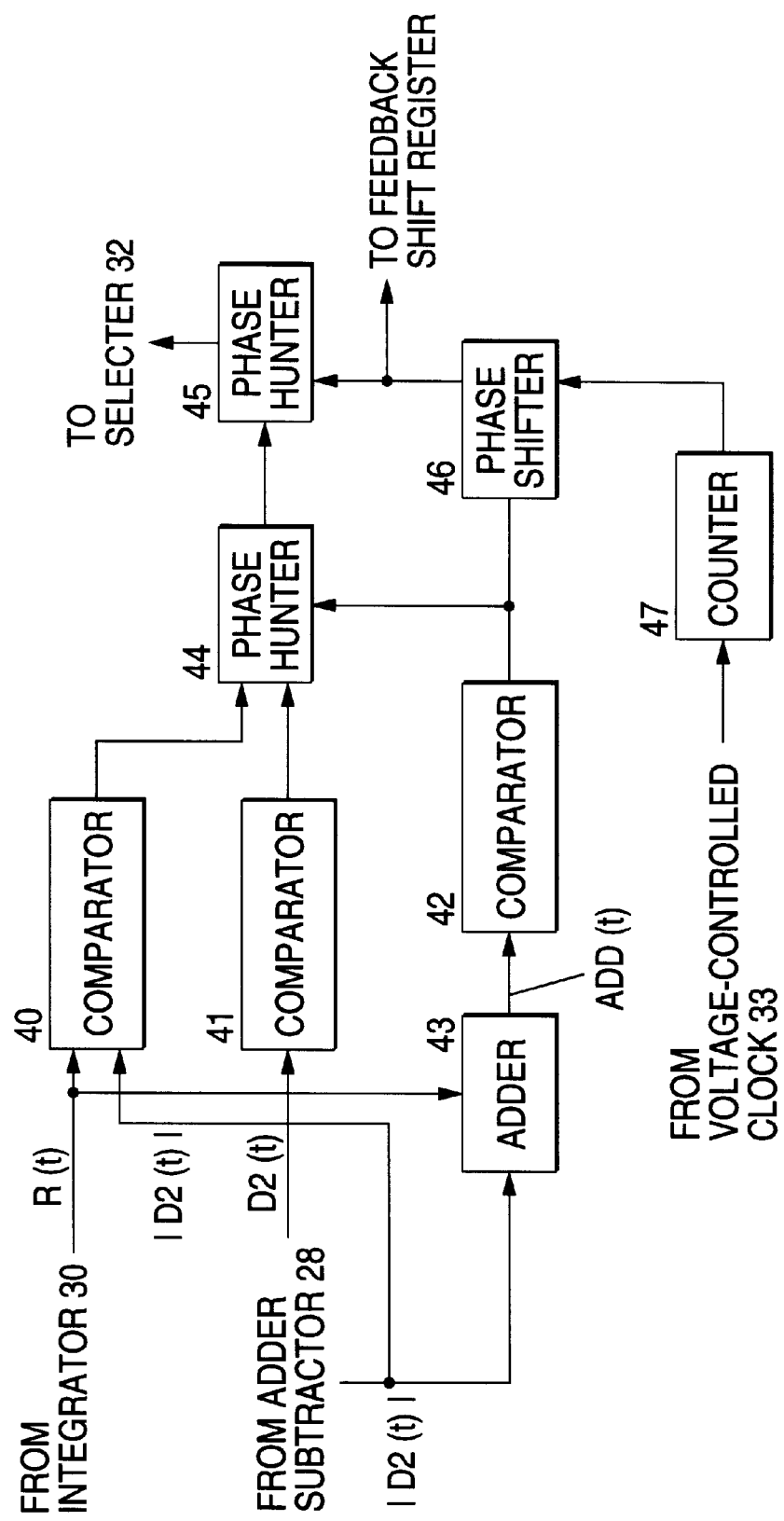
FIG. 5 is a block diagram to show the configuration of a PN code control section in the second embodiment of the invention.

The PN code control section 31 has a comparator 40 for comparing output of the integrator 30 with addition output of the adder-subtractor 28, a comparator 41 for comparing subtraction output of the adder-subtractor 28 with threshold value 0, an adder 43 for adding output of the integrator 30 and addition output of the adder-subtractor 28, a comparator 42 for comparing output of the adder 43 with threshold value 0, a phase hunter 44 for outputting any of 1, −1, or 0 based on the comparison results of the comparators 40, 41, and 42, a counter 47 for counting VCC 33 output over the integration time, a phase shifter 46 for outputting a signal for setting the shift count of the feedback shift register 34 based on the comparison result of the comparator 42 every integration time output from the counter 47, and an adder 45 for adding output of the phase hunter 44 to output of the phase shifter 46 and outputting a signal for specifying selection of the selector 32, as shown in FIG. 5.

The operation of the PN code control section will be discussed with reference to FIGS. 4A to 4D.

Figure 4A:
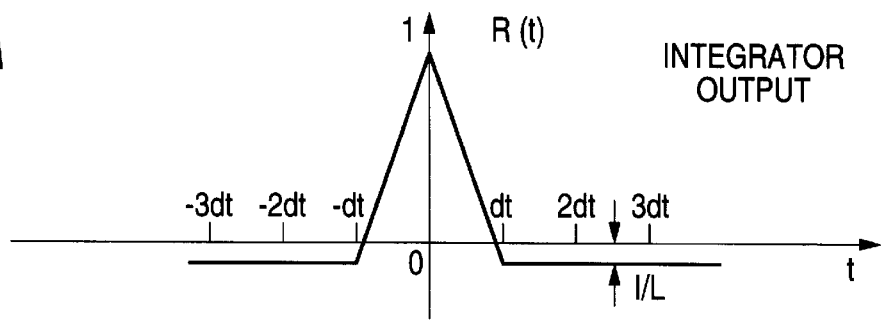
FIGS. 4A to 4D are waveform diagrams to show output characteristics of blocks of the finger in the second embodiment of the invention.
Figure 4B:
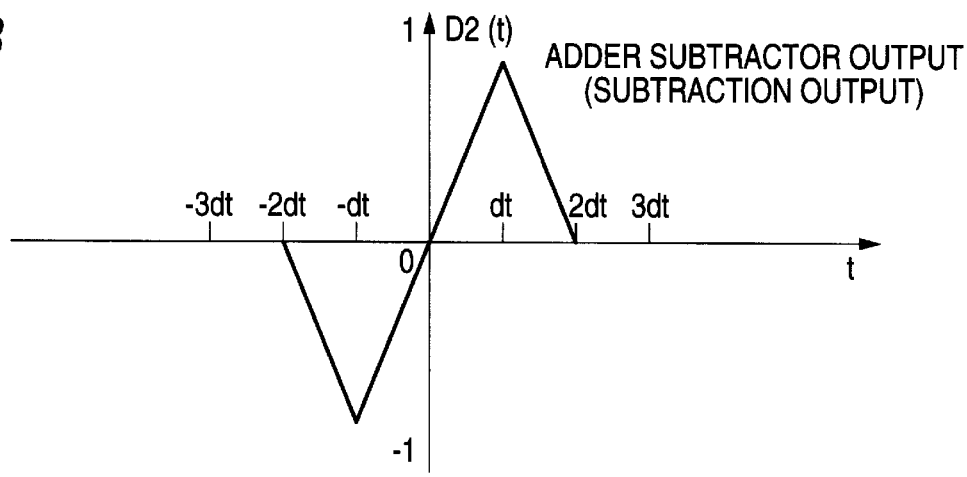
Figure 4C:
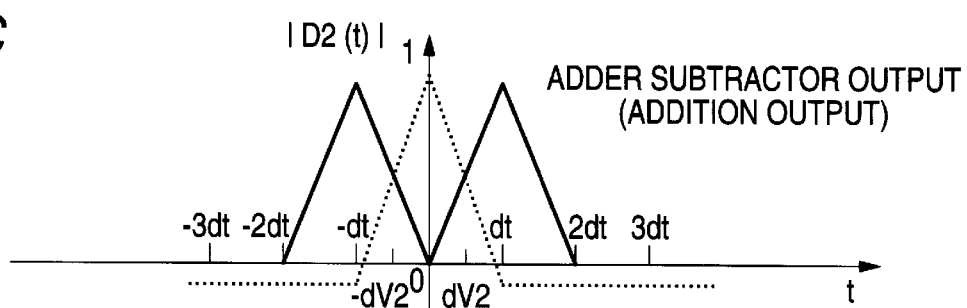
Figure 4D:
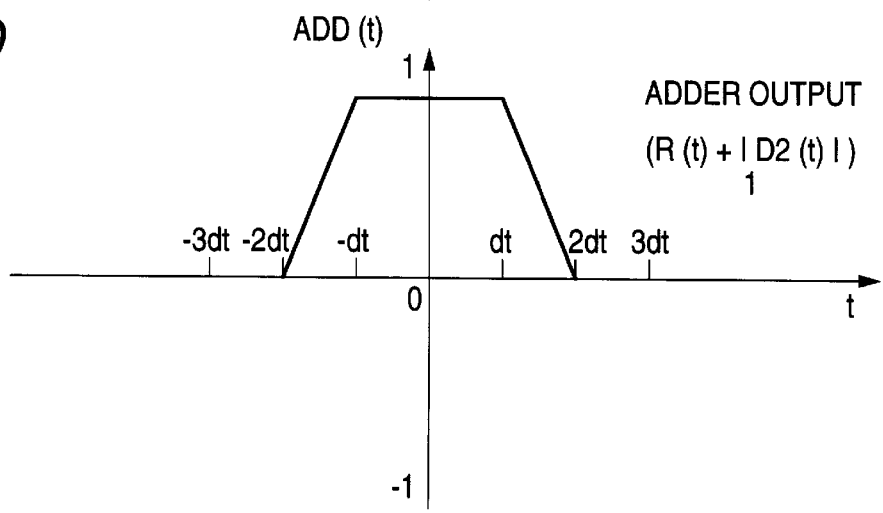

R(t) in FIG. 4A is output of the integrator 30. D2(t) in FIG. 4B is subtraction output of the adder-subtractor 28. |D2(t)| in FIG. 4C is addition output of the adder-subtractor 28. ADD(t) in FIG. 4D showing an addition characteristic of R(t) and |D2(t)| is output of the adder 43. When output of the adder 43 is greater than 0, namely, the timing difference between the transmitter and receiver lies within the range |2dt|<t, the comparator 42 outputs "1" otherwise, the comparator 42 outputs "0".

If the PN code timing difference between the transmitter and receiver lies within the range |2dt|<t, synchronization can be hunted in the finger. However, when the PN code timing difference is beyond the range |2dt|<t, the output count from the phase shifter 46 is changed in sequence so as to increment the shift count of the feedback shift register 34 by one chip until the comparator 42 outputs "1".

When the comparator 42 outputs "1", the output count of the phase shifter 46 is fixed and 1, 0 or −1 is output from the phase hunter 44 in response to the timing difference between the transmitter and receiver in the state. The value resulting from adding the output value and the output count of the phase shifter 46 is set in the selector 32. Then, the synchronization hunt operation is performed.

The operation sequence will be discussed in more detail.

The comparator 40 compares R(t) in FIG. 4A with |D2(t)| in FIG. 4C. As seen in FIG. 4A and 4C, the interval of $$R(t) \geq |D2(t)| \quad \text{(Expression 6)}$$

is $$-dt/2 \leq t \leq dt/2. \quad \text{(Expression 7)}$$

At this interval, D2(t) in FIG. 4B becomes an increasing function passing through the origin, namely, the synchronization hunt range. If the PN code phase difference between the transmitter and receiver is drawn into the range, the subtraction output of the adder-subtractor 28 is used only to control the phase of the VCC 33, whereby the PN code of the reception signal can be hunted.

The comparator 40 outputs "1" at the interval; otherwise, the comparator 40 outputs "0". (This output value is set to be COMP1).

The comparator 41 compares D2(t) with threshold value 0. When $$D2(t) \leq 0, \quad \text{(Expression 8)}$$

the comparator 41 outputs "0"; otherwise, the comparator 41 outputs "1". (This output value is set to be COMP2.) The adder 43 adds R(t) and |D2(t)| and its output characteristic becomes ADD(t) in FIG. 4D. The comparator 42 compares ADD(t) with threshold value 0. When $$ADD(t) \leq 0 \quad \text{(Expression 9)}$$

namely, when $$|2dt| < t \quad \text{(Expression 10)}$$

the comparator 42 outputs "0"; otherwise, the comparator 42 outputs "1". (This output value is set to be COMP3.)

The phase hunter 44 outputs any of 1, −1 or 0 to the adder 45 based on COMP1, COMP2, and COMP3.

Table 1 lists the output conditions of the phase hunter 44.

TABLE 1

| t | 2|dt|<t | −2dt≤t<−dt/2 | −dt/2≤t≤dt/2 | dt/2<t≤2dt |
|---|---|---|---|---|
| COMP1 | 0 | 0 | 1 | 0 |
| COMP2 | 0 | 0 | 1 or 0 | 1 |
| COMP3 | 0 | 1 | 1 | 1 |
| PHASE HUNTER OUTPUT | 0 | +1 (1chip lag) | Hold | −1 (1chip lead) |

Now, assume that COMP1 output at the synchronization acquisition start time of reception PN code is "0".

When $$-2dt \leq t \leq 2dt, \quad \text{(Expression 11)}$$

$$COMP3=1. \quad \text{(Expression 12)}$$

Further, if $$COMP2=1, \quad \text{(Expression 13)}$$

namely, $$0 \leq t \leq 2dt \quad \text{(Expression 14)}$$

and $$COMP1=0, \quad \text{(Expression 15)}$$

namely, $$|dt/2| > t, \quad \text{(Expression 16)}$$

$$dt/2 < t \leq 2dt. \quad \text{(Expression 17)}$$

At this time, the phase hunter 44 output is set to "−1". That is, a 1-chip lead is specified. Because of this lead, the PN code timing difference between the transmitter and receiver becomes $$-dt/2 < t \leq dt, \quad \text{(Expression 18)}$$

and enters the increasing range of D2(t) of $$-dt \leq t \leq dt, \quad \text{(Expression 19)}$$

thus, can be drawn into the synchronization hunt range.

Next, in the case of (Expression 11) −2dt≤t≤2dt, if $$COMP2=0 \quad \text{(Expression 20)}$$

namely, $$-2dt \leq t < 0 \quad \text{(Expression 21)}$$

and (Expression 15), namely, (Expression 16), $$-2dt \leq t \leq -dt/2. \quad \text{(Expression 22)}$$

At this time, the phase hunter 44 output is set to "+1". That is, a 1-chip lag is specified. Because of this lag, the timing difference between the transmitter and receiver becomes $$-dt \leq t < dt/2, \quad \text{(Expression 23)}$$

and enters the increasing range of D2(t) (Expression 19), thus can be drawn into the synchronization hunt range.

In addition, when $$COMP3=0, \quad \text{(Expression 24)}$$

no correlation is detected, thus the phase hunter 44 outputs "0", namely, is not involved in the synchronization acquisition and hunt operation. When COMP1 output is "1", output of the phase hunter 44 is held.

Thus, if the interval is (Expression 11), the finger can hunt the phase of the reception PN code with the DLL.

On the other hand, the phase shifter 46 selects PN code phase of the receiver PN[k] to synchronize PN codes between the transmitter and receiver. The operation of the phase shifter 46 will be discussed.

In order to acquire synchronization, a method of making PN[k] lag or lead by one chip until an auto-correlation value is detected is available. Here, the method of making PN[k] lag by one chip is used.

When synchronization acquisition starts, the phase shifter 46 outputs a numeric value greater than 3, for example, 4 to the adder 45 and the feedback shift register 34 to prevent the number of taps from overflowing as the phase shifter 44 performs the lag/lead (+/−) operation and PN[k−1] is used.

The phase shifter 46 checks the comparator 42 for output each time the count of the counter 47 indicates the integration time. If the comparator 42 outputs "1", output is fixed intact. If the comparator 42 outputs "0", the phase shifter 46 outputs 5 to delay PN code by one chip. If the comparator 42 furthermore outputs "0", counting up is continued until "1" is detected. However, the upper limit is set to N−2 (where N is the number of taps of the feedback shift register 34) to prevent the number of taps from overflowing.

If "1" is not detected, the feedback shift register 34 is reset and detection is again started in a similar manner to that described above. The counter 47 counts VCC 33 output at the integration interval, and outputs a signal input to the phase shifter 46 for use as a flag indicating the integration time. The adder 45 adds phase shifter 46 output and phase hunter 44 output. The addition result output from the adder 45 becomes an input signal of the selector 32 in FIG. 3 for determining the PN codes of the receiver (PN[k−1], PN[k], and PN[k+1]). Since the phase hunter 44 outputs "0" before synchronization is acquired, the phase shifter 46 output becomes PN[k] of the receiver. After the synchronization is acquired, the value resulting from adding phase hunter 44 output in the pattern shown in Table 1 and the phase shifter 46 becomes PN[k] of the receiver.

Thus, the receiver of the second embodiment is provided with the PN code control section having the comparator 40 for comparing |D2(t)| with R(t), the comparator 41 for comparing D2(t) with threshold value 0, the adder 43 for adding |D2(t)| and R(t), the comparator 42 for comparing the adder 43 output with threshold value 0, the phase hunter 44 for outputting −1, +1 or 0 according to the pattern in Table 1 based on the comparator 40 output, the comparator 41 output, and the comparator 42 output, the phase shifter 46 for selecting receiver PN code PN[k] based on the comparator 42 output and resetting the feedback shift register 34, the counter 47 for counting the integration time, and the adder 45 for combining the phase hunter 44 output and the phase shifter 46 output, whereby the receiver can execute synchronization acquisition and hunt of PN code in the range twice that of the conventional DLL (synchronization acquisition and hunt range: (Expression 19)). Therefore, the synchronization acquisition can be speeded up and synchronization hunt in a wide range is enabled.

In the embodiment, the phase of a PN code generated by the PN code generator 35 is changed through the feedback shift register 34 and the selector 32 and the PN code having the phase changed is supplied to the multiplier 23, 24, or 25. However, the phase is changed only by using the feedback shift register 34 and the shift amount of the feedback shift register 34 can be controlled by the PN code control section or any other configuration is also possible.

The configurations of the first and second embodiments can be synthesized appropriately.

As understood from the description made so far, the mobile communication receiver of the invention can reduce power consumption by controlling power on and off of the fingers.

The synchronization hunt range of the fingers is enlarged and synchronization acquisition can be speeded up.

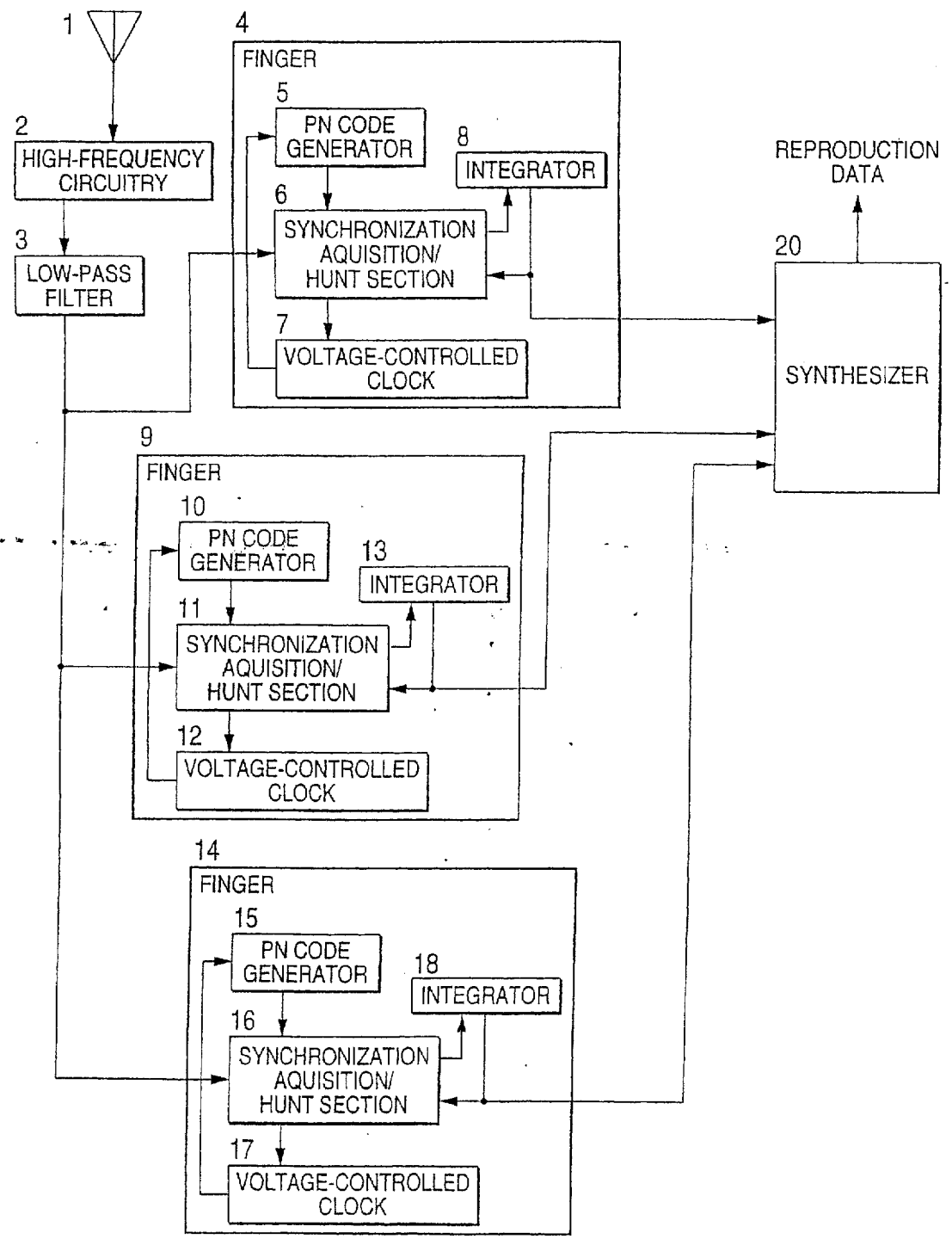

What is claimed is:

1. A mobile communication receiving apparatus of a spread spectrum communication system comprising:
   a plurality of inverse spread modulation and data demodulation sections;
   a synthesizer for synthesizing data reproduced by said plurality of inverse spread modulation and data demodulation sections;
   power measurement means for measuring power of reproduction output of each of said plurality of inverse spread modulation and data demodulation sections and total power thereof;
   error detection means for detecting an error of output data of said synthesizer; and
   control means for controlling power on and off of said plurality of inverse spread modulation and data demodulation sections based on the measurement result of said power measurement means and the error detection result of said error detection means.

2. The mobile communication receiving apparatus as claimed in claim 1, wherein said control means stores the total power corresponding to reference error data from relationship between the total power measured by said power measurement means and the error detected by said error detection means; and if a value resulting from subtracting from the total power of reproduction output of said operating inverse spread modulation and data demodulation sections is equal to or greater than a value resulting from adding the power of the inverse spread modulation and data demodulation section having the minimum reproduction output power among said operating inverse spread modulation and data demodulation sections and a constant which is a positive real number, a power of the inverse spread modulation and data demodulation section having the minimum reproduction output power is made off.

3. The mobile communication receiving apparatus as claimed in claim 1, wherein each of said plurality of inverse spread modulation and data demodulation sections comprises:
   a first multiplier for multiplying a PN code (PN(k)) synchronized with a PN code of a transmitter by a base band reception signal;
   a first integrator for integrating output of said first multiplier;
   a second multiplier for multiplying a PN code (PN(k−1)) leading the PN(k) by one chip in phase by the base band reception signal;
   a second integrator for integrating output of said second multiplier;
   a third multiplier for multiplying a PN code (PN(k+1) lagging the PN(k) by one chip in phase by the base band reception signal;
   a third integrator for integrating output of said third multiplier;
   an adder-subtractor for performing addition and subtraction on outputs of said second and third integrators;
   a PN code generator for generating the same PN codes as the transmitter;
   PN code supply means for changing phases of the PN codes generated by said PN code generator and supplying the resultant PN codes to said first, second, and third multipliers; and
   PN code control means for controlling phase amount of the PN code changed by said PN code supply means based on addition and subtraction result values of said adder-subtractor and output of said first integrator.

4. The mobile communication receiving apparatus as claimed in claim 3, wherein said PN code control means comprises:
   a first comparator for comparing output of said first integrator with the addition result value of said adder-subtractor in greater-than, equal-to or less-than relation;
   a second comparator for comparing the subtraction result value of said adder-subtractor with a numeric value 0 in greater-than, equal-to or less-than relation;
   a third comparator for comparing a value ADD resulting from adding the addition result value of said adder-subtractor to output of said first integrator with a numeric value 0 in greater-than, equal-to or less-than relation and outputting 1 when ADD>0, otherwise 0;

a phase shifter for outputting a phase amount control value to said PN code supply means so as to shift the phase of the PN code supplied by said PN code supply means by one chip every integration time when said third comparator outputs 0, and a phase hunter for selectively outputting a value 0, 1 or −1 based on outputs of said first and second comparators when said third comparator outputs 1, wherein the output of the phase hunter is added to the output of the phase shifter.

5. The mobile communication receiving apparatus as claimed in claim 4, wherein said PN code supply means comprises:

a feedback shift register for cyclically shifting the PN codes generated by said PN code generator and outputting register values PN(i) (i=1, 2, 3, . . . , N); and a selector for selecting the PN(k−1), PN(k) and PN(k+1) from among the register values PN(i) of said feedback shift register;

wherein a shift amount of said feedback shift register is controlled by the output value of said phase shifter and wherein selection of said selector is controlled by a value resulting from adding the output value of said phase shifter and output of said phase hunter.

6. A mobile communication receiving apparatus of a spread spectrum communication system comprising a plurality of inverse spread modulation and data demodulation sections and a synthesizer for synthesizing data reproduced by said plurality of inverse spread modulation and data demodulation sections, each of said plurality of inverse spread modulation and data demodulation sections comprising:

a first multiplier for multiplying a PN code (PN(k)) synchronized with a PN code of a transmitter by a base band reception signal;

a first integrator for integrating output of said first multiplier;

a second multiplier for multiplying a PN code (PN(k−1)) leading the (PN(k)) by one chip in phase by the base band reception signal;

a second integrator for integrating output of said second multiplier;

a third multiplier for multiplying a PN code (PN[k+1]) lagging the (PN(k)) by one chip in phase by the base band reception signal;

a third integrator for integrating output of said third multiplier;

an adder-subtractor for performing addition and subtraction on outputs of said second and third integrators;

a PN code generator for generating the same PN codes as the transmitter;

PN code supply means for changing phases of the PN codes generated by said PN code generator and supplying the resultant PN codes to said first, second, and third multipliers; and PN code control means for controlling phase amount of the PN code changed by said PN code supply means based on addition and subtraction result values of said adder-subtractor and output of said first integrator.

7. The mobile communication receiving apparatus as claimed in claim 6, wherein said PN code control means comprises:

a first comparator for comparing output of said first integrator with the addition result value of said adder-subtractor in greater-than, equal-to or less-than relation;

a second comparator for comparing the subtraction result value of said adder-subtractor with a numeric value 0 in greater-than, equal-to or less-than relation;

a third comparator for comparing a value ADD resulting from adding the addition result value of said adder-subtractor to output of said first integrator with a numeric value 0 in greater-than, equal-to or less-than relation and outputting 1 when ADD>0, otherwise 0;

a phase shifter for outputting a phase amount control value to said PN code supply means so as to shift the phase of the PN code supplied by said PN code supply means by one chip every integration time when said third comparator outputs 0, and a phase hunter for selectively outputting a value 0, 1 or −1 based on outputs of said first and second comparators when said third comparator outputs 1, wherein the output of the phase hunter is added to the output of the phase shifter.

8. The mobile communication receiving apparatus as claimed in claim 7, wherein said PN code supply means comprises:

a feedback shift register for cyclically shifting the PN codes generated by said PN code generator and outputting register values PN(i) (i=1, 2, 3, . . . , N); and a selector for selecting the PN(k−1), PN(k), and PN(k+1) from among the register values PN(i) of said feedback shift register;

wherein a shift amount of said feedback shift register is controlled by the output value of said phase shifter wherein selection of said selector is controlled by a value resulting from adding the output value of said phase shifter and output of said phase hunter.

\* \* \* \* \*

UNITED STATES PATENT AND TRADEMARK OFFICE
CERTIFICATE OF CORRECTION

PATENT NO.   : 5,970,084
DATED        : October 19, 1999
INVENTOR(S)  : Shoichiro Honda It is certified that error appears in the above-identified patent and that said Letters Patent is hereby corrected as shown below:

Drawings:

Replace drawing sheet of Fig. 2, Fig 3, Fig. 5, Fig. 6 and Fig. 7 and substitute therefor the attached sheets of drawings shown on the attached sheets.

```
Column 6, Line 22, delete "Pt-Ps>P1+d(Pt+P1+P2+P3)" and
    insert --Pt-Ps P1+d(Pt=P1+P2+P3)--.

Column 7, Line 57, delete "subtractor" and insert
    --subtraction--.
```

Signed and Sealed this

Eighteenth Day of July, 2000

Q. TODD DICKINSON

*Attest:*

*Attesting Officer*      *Director of Patents and Trademarks*